(12) United States Patent
Kondo

(10) Patent No.: US 6,609,648 B2
(45) Date of Patent: Aug. 26, 2003

(54) ULTRASONIC BONDING METHOD OF ELECTRIC WIRES

(75) Inventor: Masayuki Kondo, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/032,552

(22) Filed: Jan. 2, 2002

(65) Prior Publication Data

US 2002/0130159 A1 Sep. 19, 2002

(30) Foreign Application Priority Data

Mar. 16, 2001 (JP) ......................... 2001-076744

(51) Int. Cl.[7] ............. B23K 5/20; B23K 1/06; B23K 37/00; B23K 20/10
(52) U.S. Cl. ............... 228/110.1; 228/110.1; 228/1.1; 228/180.5; 228/4.5; 29/872
(58) Field of Search ............... 228/110.1, 1.1, 228/180.5, 4.5, 111; 29/868, 872, 873; 156/73.1, 73.2, 580.1, 580.2

(56) References Cited

U.S. PATENT DOCUMENTS

| | | | | | |
|---|---|---|---|---|---|
| 3,674,914 A | * | 7/1972 | Burr | ............................ | 174/261 |
| 4,730,764 A | * | 3/1988 | Hawkins et al. | ............. | 228/1.1 |
| 4,867,370 A | * | 9/1989 | Welter et al. | ............. | 228/110.1 |
| 5,584,122 A | * | 12/1996 | Kato et al. | ..................... | 29/872 |
| 5,925,202 A | * | 7/1999 | Ide et al. | .................... | 156/73.2 |
| 6,202,915 B1 | * | 3/2001 | Sato | ........................ | 228/110.1 |
| 6,313,407 B1 | * | 11/2001 | Shinchi et al. | ............ | 174/84 R |
| 2002/0074383 A1 | * | 6/2002 | Kondo | ........................ | 228/212 |

* cited by examiner

Primary Examiner—Tom Dunn
Assistant Examiner—L. Edmondson
(74) Attorney, Agent, or Firm—Oblon, Spivak, McClelland, Maier & Neustadt, P.C.

(57) ABSTRACT

Electric wires (20) and (21) are intersected with each other at right angles such that the electric wires (20) and (21) are inclined with respect to the vibration direction of ultrasonic vibration through 45°, intersected portions (C) of the electric wires (20) and (21) are set between a horn-side chip (11) and an anvil-side chip (12) in a pressurized state, and ultrasonic vibration is input to the intersected portions (C), thereby bonding the electric wires (20) and (21) to each other.

3 Claims, 4 Drawing Sheets

ULTRASONIC BONDING METHOD OF ELECTRIC WIRES

BACKGROUND OF THE INVENTION

1. Field of the Invention

The present invention relates to an ultrasonic bonding method of electric wires in which electric wires to be bonded are intersected with each other, and intersected portions are bonded to each other by ultrasonic vibration.

2. Description of Related Art

In an ultrasonic bonding of coated electric wires, the coated electric wires are subjected to ultrasonic vibration and pressurizing force at the same time, thereby bonding the wires to each other (see Japanese Patent Application Laid-open No. H7-212036). The electric wires can be bonded to each other using the ultrasonic bonding method (see Japanese Patent Application Laid-open No. H9-29445).

FIG. 1 shows one example of an ultrasonic bonding apparatus 1. In the ultrasonic bonding apparatus 1, a horn 1b projects from an oscillator 1a in a horizontal direction, and a horn-side chip 1c is fixed to a tip end of the horn 1b. An anvil-side chip 1d is opposed to the horn-side chip 1c, and the anvil-side chip 1d is fixed to a base 1e. When intermediate portions of the electric wires 2 and 3 are to be bonded to each other, the electric wires 2 and 3 are intersected with each other, their intersected portions C are sandwiched between the horn-side chip 1c, and the anvil-side chip 1d and in this state, the horn-side chip 1c, is subjected to ultrasonic vibration, thereby bonding the intersected portions C. At that time, a vibration direction X of the ultrasonic vibration input to the horn-side chip 1c is a projecting direction of the horn 1b.

In the conventional ultrasonic bonding method of electric wires, however, it is general that the one electric wire 2 is disposed in a direction perpendicular to the vibration direction X at right angles, and the other electric wire 3 is disposed in the vibration direction X as shown in FIG. 2. Therefore, when conductors 2a and 3a are stranded wires, when the conductors 2a and 3a are to be bonded after insulators 2b and 3b of the electric wires 2 and 3 are molten and removed as shown in FIG. 3, a rotation (rolling) direction of the conductor 2a intersecting the vibration direction X at right angles and a vibration input direction coincide with each other. Thus, the vibration energy of the ultrasonic vibration adversely escapes as rotation of the conductor 2a, and the vibration energy can not be transmitted to a surface of the conductor, which deteriorates bonding effect. If attempt is made to increase the pressurizing force against the horn-side chip 1c to suppress the rotation of the conductor 2a, the thin conductor 2a is cut by the excessive pressurizing force.

SUMMARY OF THE INVENTION

It is an object of the present invention to provide a ultrasonic bonding method of electric wire in which when intersected portions of electric wires are connected by ultrasonic vibration, vibration energy of the ultrasonic vibration can be transmitted to a surface of a conductor without exerting excessive pressurizing force, and bonding efficiency the conductors can be enhanced.

A first aspect of the present invention provides an ultrasonic bonding method of electric wires wherein electric wires are intersected with each other at right angles such that the electric wires are inclined with respect to the vibration direction of ultrasonic vibration through 45° or about 45, intersected portions of the electric wires are set between a horn-side chip and an anvil-side chip in a pressurized state, and ultrasonic vibration is input to the intersected portions, thereby bonding the electric wires to each other.

In this case, since the ultrasonic vibration is applied to the intersected portions of the electric wires from a direction inclined with respect to the electric wires through 45° or about 45°, rotation of the conductors of the electric wires are prevented or suppressed, the ultrasonic vibration energy can efficiently be transmitted to the surfaces of the conductors, and the bonding efficiency between the conductors can be enhanced.

According to a second aspect of the invention, in the above ultrasonic bonding method of electric wires, the horn-side chip and the anvil-side chip have set surfaces, and at least the set surface of the horn-side chip is provided with an uneven portion formed with grid-like grooves which are in parallel to and perpendicular to the vibration direction.

In this case, even if the electric wires are inclined, the intersected portions of the electric wires can be sandwiched between the horn-side chip and the anvil-side chip without slip and thus, the ultrasonic vibration energy can efficiently be transmitted to the intersected portions of the electric wires.

DETAILED DESCRIPTION OF PREFERRED EMBODIMENT

An embodiment of the present invention will be explained in detail with reference to the accompanying drawings.

Figure 4:
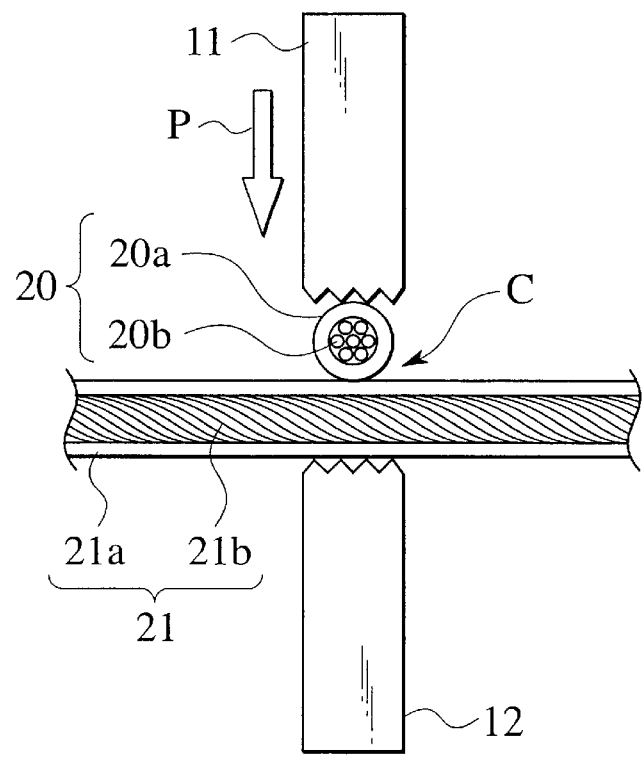
FIG. 4 is a sectional view of an essential portion of a set state of electric wires according to an embodiment of an ultrasonic bonding method of electric wire of the present invention.

In an ultrasonic bonding method of electric wires according to the present embodiment, coated electric wires are used as electric wires. As shown in FIG. 4, a horn-side chip 11 and an anvil-side chip 12 are vertically disposed such as to be opposed to each other. Coated electric wires 20 and 21 to be connected are intersected with each other between the horn-side chip 11 and the anvil-side chip 12, and intersected portions C of the coated electric wires 20 and 21 are set. The horn-side chip 11 is vertically movable, and the anvil-side chip 12 is fixed. If the horn-side chip 11 is lowered, the intersected portions C of the coated electric wires 20 and 21 disposed between the chips 11 and 12 are sandwiched under an appropriate pressurizing force in a pressurizing direction P.

If the ultrasonic vibration is propagated from an oscillator (not shown) to the horn-side chip 11, frictional heat is generated in the intersected portions C of the coated electric wires 20 and 21, the insulators 20a and 21a of the coated electric wires 20 and 21 are molten and removed first and then, both the conductors 20b and 21b of stranded wire structure are bonded to each other.

Figure 5:
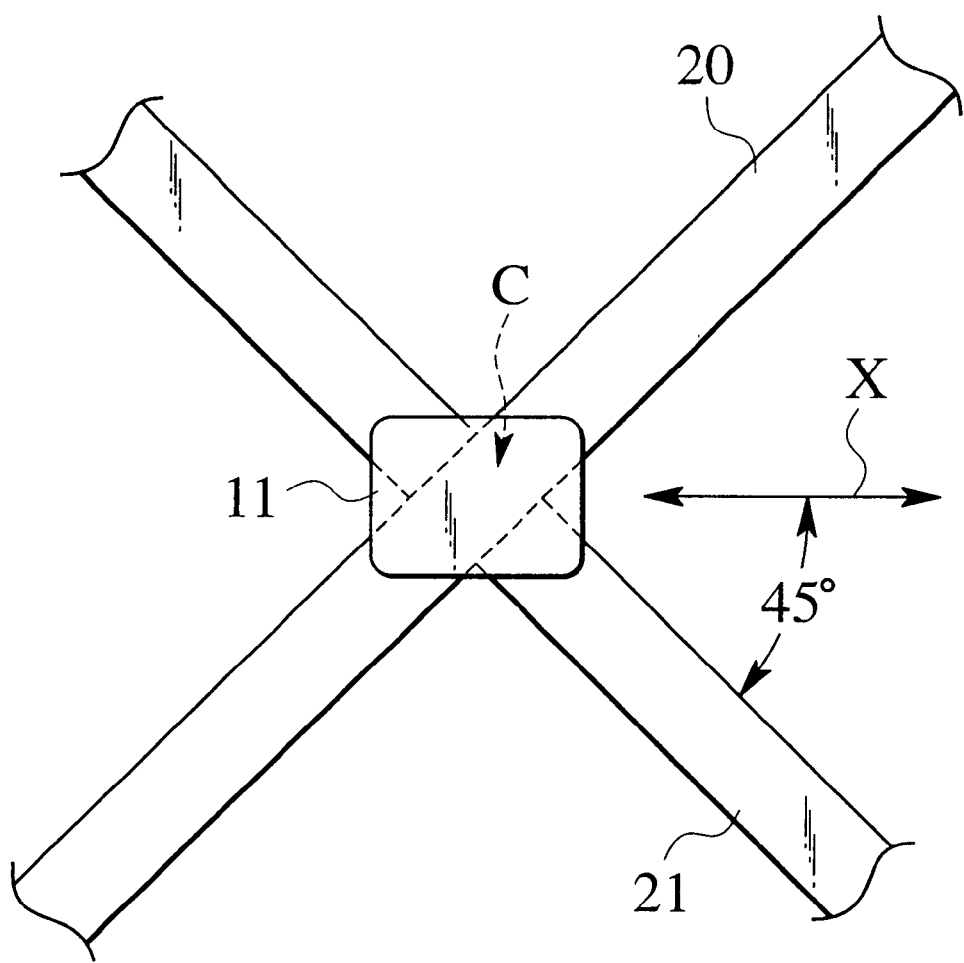
FIG. 5 is a plan view of a set state of the electric wires according to the embodiment of the ultrasonic bonding method of the electric wires of the invention.

In the present embodiment, as shown in FIG. 5, when the coated electric wires 20 and 21 are set between the horn-side chip 11 and the anvil-side chip 12, the coated electric wires 20 and 21 are inclined with respect to the vibration direction X of the ultrasonic vibration input to the horn-side chip 11 through 45°. The inclination direction in this case is a direction along a horizontal plane of course.

Figure 6A:
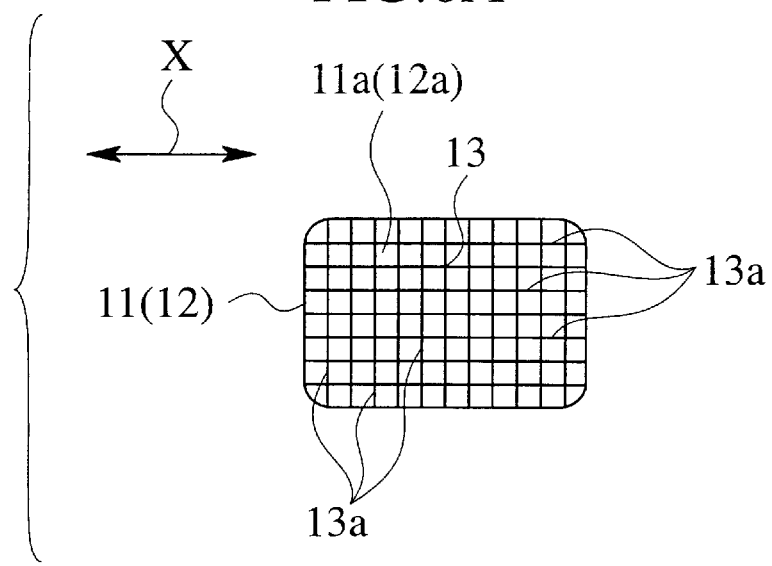
FIGS. 6A, 6B and 6C are explanatory views showing a tip end structure of a chip according to the embodiment of the ultrasonic bonding method of the electric wires of the invention, and are end surface view, front view and side view, respectively.
Figure 6B:
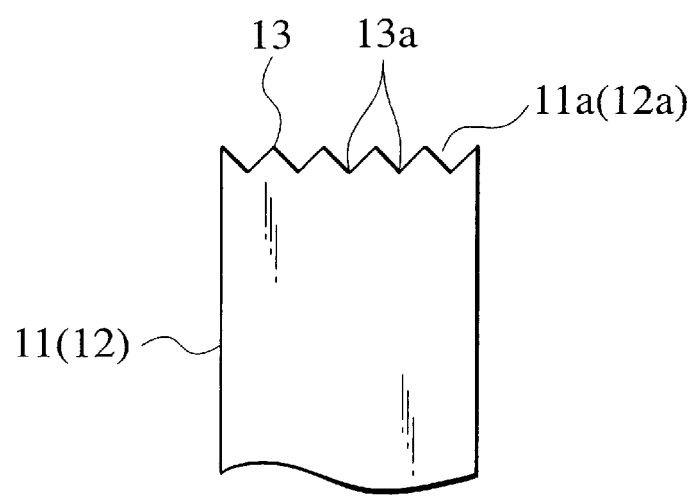
Figure 6C:
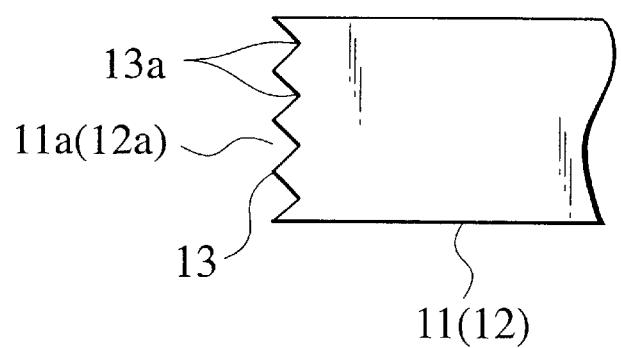

In the present embodiment, as shown in FIGS. 6A and 6B, tip ends of the horn-side chip 11 and the anvil-side chip 12 are formed in such a manner that set surfaces (tip end surfaces) 11a and 12a which abut against the intersected portions C of the coated electric wires 20 and 21 are provided with uneven portions 13. Each of the uneven portions 13 is formed with grooves 13a in a grid-like form. The grooves 13a are in parallel to and perpendicular to the vibration direction X.

In accordance with the above structure, in the ultrasonic bonding method of electric wires of the present embodiment, when the intersected portions C of the coated electric wires 20 and 21 are set between the horn-side chip 11 and the anvil-side chip 12, the coated electric wires 20 and 21 are inclined with respect to the vibration direction X of the ultrasonic vibration through 45°. Therefore, the rotation directions of the conductors 20b and 21b can be differentiated from the vibration direction X. Thus, the ultrasonic vibration energy can efficiently be transmitted to the surfaces of the conductors 20b and 21b, and the bonding efficiency between the conductors 20b and 21b can be enhanced without applying the excessive pressurizing force between the horn-side chip 11 and the anvil-side chip 12.

In the present embodiment, the set surfaces 11a and 12a of the horn-side chip 11 and the anvil-side chip 12 are formed with the grid-like uneven portions 13 having the grooves 13a which are in parallel to and perpendicular to the vibration direction X. Therefore, even when the coated electric wires 20 and 21 are inclined, the chips 11 and 12 can sandwich the intersected portions C therebetween without slip, and the ultrasonic vibration energy can efficiently be transmitted to the surfaces of the conductors 20b and 21b. A combination of the design that the coated electric wires 20 and 21 are inclined with respect to the vibration direction X through 45° and the design that the tip ends of the chips 11 and 12 are formed with the uneven portions 13 further enhance the bonding efficiency between the conductors 20b and 21b. In this case, even if the uneven portion 13 is formed at least on the horn-side chip 11, the ultrasonic vibration can efficiently be transmitted to the intersected portions C.

In this bonding, films of oxide on the bonded surfaces of the conductors 20b and 21b are destroyed by the ultrasonic energy, metal surfaces are cleaned and as a result, activated metal atoms are bonded to each other, thereby electrically bonding the conductors 20b and 21b to each other. In this case, the conductors 20b and 21b are so-called cold bonded at a temperature lower than a molten temperature.

Figure 1:
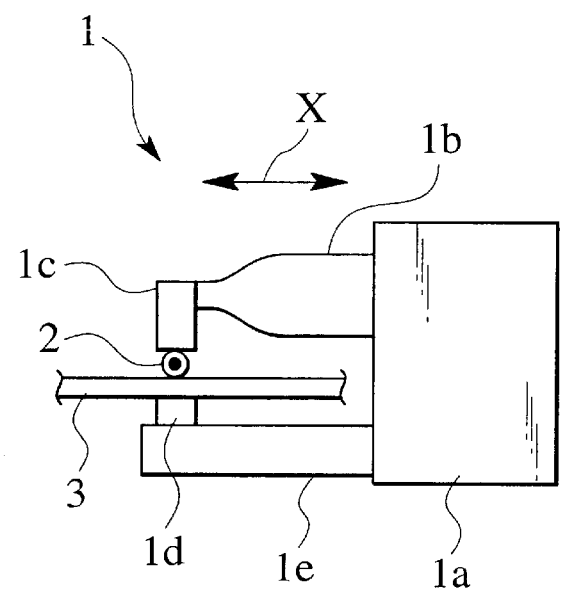
FIG. 1 is a side view showing one example of a conventional ultrasonic bonding apparatus.
Figure 2:
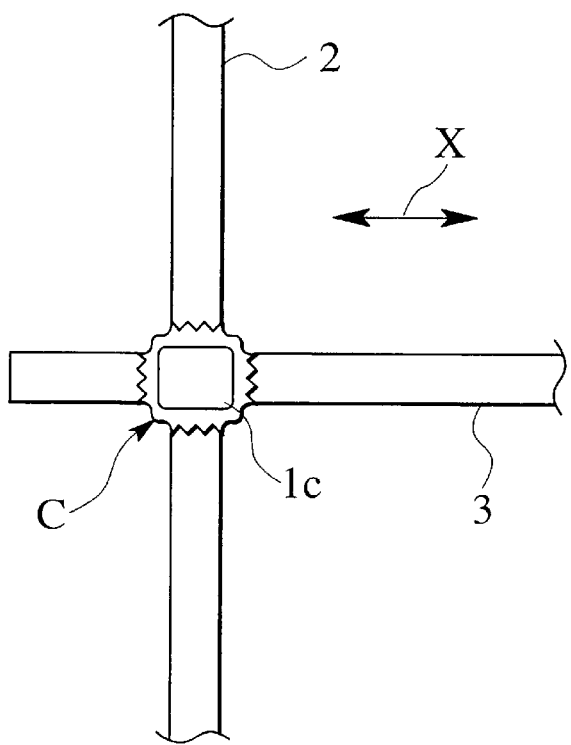
FIG. 2 is a plan view of a conventional set state of electric wires to be ultrasonic bonded.
Figure 3:
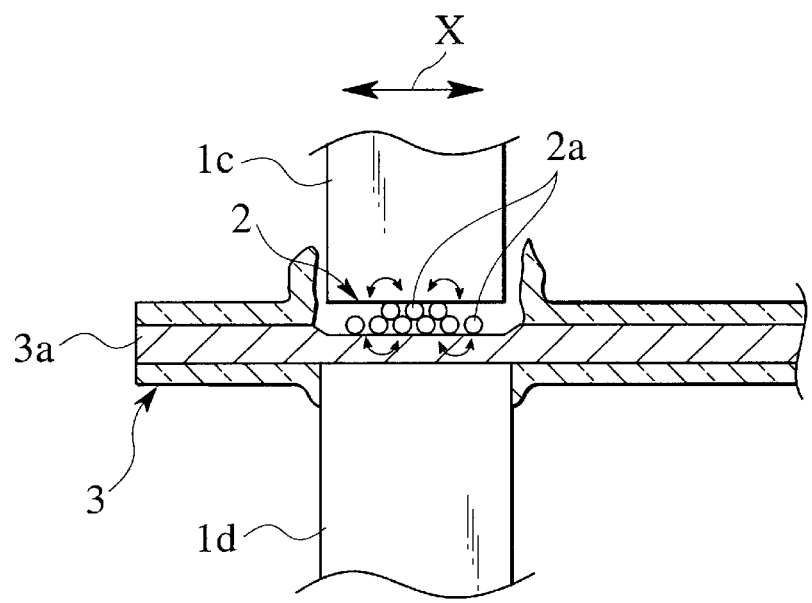
FIG. 3 is a sectional view of an essential portion of a conventional ultrasonic bonding state of electric wires.

Further, when the oscillator 1a of the ultrasonic bonding apparatus projects from the horn 1b as shown in FIG. 1, it is possible to prevent the long coated electric wires 20 and 21 from interfering with the oscillator 1a, which enhances bonding operability.

Although the coated electric wires 20 and 21 are inclined with respect to the vibration direction X through 45° in the present embodiment, the inclination direction is not limited to 45°, and even if the angle is near 45°, the same object can be achieved of course. Further, each of the horn-side chip 11 and the anvil-side chip 12 has a rectangular cross section as shown in FIG. 6A, this shape is not limited only if it can efficiently sandwich the intersected portions C, and the shape may be circular for example. Furthermore, as electric wires to be bonded, the coated electric wires 20 and 21 having stranded wire structure are shown, but the present invention can of course be applied to bare electric wires which are not coated with the insulators 20a and 21a or to conductors 20b and 21b which are not stranded wires.

What is claimed is:

1. An ultrasonic bonding method of electric wires, comprising:

intersecting electric wires with each other at right angles such that the electric wires are inclined through 45° or about 45° with respect to a vibration direction of ultrasonic vibration, said vibration direction defined in a plane parallel to planes including said electric wires;

setting intersected portions of the electric wires between a horn-side chip and an anvil-side chip in a pressurized state; and inputting ultrasonic vibration in the vibration direction to the intersected portions, thereby bonding the electric wires to each other.

2. An ultrasonic bonding method of electric wires according to claim 1, wherein the horn-side chip and the anvil-side chip have set surfaces, and at least the set surface of the horn-side chip is provided with an uneven portion formed with grooves which are in parallel to and perpendicular to the vibration direction.

3. An ultrasonic bonding method of electric wires, comprising:

intersecting electric wires with each other at right angles such that the electric wires are inclined through 45° or about 45° with respect to a vibration direction of ultrasonic vibration, said vibration direction defined in a plane parallel to planes including said electric wires;

setting intersected portions of the electric wires between a horn-side chip and an anvil-side chip in a pressurized state; and inputting ultrasonic vibration in the vibration direction to the intersected portions, thereby bonding the electric wires to each other, wherein the horn-side chip an the anvil-side chip have set surfaces, and at least the set surface of the horn-side chip is provided with an uneven portion formed with grooves which are in parallel to and perpendicular to the vibration direction.

* * * * *